United States Patent
Hazel, Jr.

(10) Patent No.: US 9,687,097 B2
(45) Date of Patent: Jun. 27, 2017

(54) DRINK INSULATOR STABILIZER SYSTEM AND METHOD

(71) Applicant: William Hazel, Jr., Ponte Vedra, FL (US)

(72) Inventor: William Hazel, Jr., Ponte Vedra, FL (US)

( * ) Notice: Subject to any disclaimer, the term of this patent is extended or adjusted under 35 U.S.C. 154(b) by 16 days.

(21) Appl. No.: 14/867,147

(22) Filed: Sep. 28, 2015

(65) Prior Publication Data

US 2017/0086613 A1 Mar. 30, 2017

(51) Int. Cl.
*A47G 23/02* (2006.01)
*A45F 5/00* (2006.01)
*F16M 13/00* (2006.01)

(52) U.S. Cl.
CPC ............ *A47G 23/0225* (2013.01); *A45F 5/00* (2013.01); *F16M 13/00* (2013.01); *A45F 2200/0583* (2013.01); *A47G 2023/0291* (2013.01)

(58) Field of Classification Search
CPC ........ A47G 23/0225; A47G 2023/0291; A45F 5/00; A45F 2200/0583; F16M 13/00; F16M 11/16; F16M 11/242; F16M 11/04; F16M 11/041; B65D 25/22
USPC ............... 220/737–743, 475, 630, 629, 628; 248/156, 163.1, 165, 170, 166, 149, 150, 248/146
See application file for complete search history.

(56) References Cited

U.S. PATENT DOCUMENTS

| | | | | |
|---|---|---|---|---|
| 4,505,408 A * | 3/1985 | Sagol | .................... | B65D 90/14 108/127 |
| 4,969,618 A * | 11/1990 | Thompson | ............. | A47G 7/025 248/152 |
| 6,533,140 B1 * | 3/2003 | Freeman | ............ | A47G 23/0266 220/475 |
| 7,726,621 B1 * | 6/2010 | Dellinger | ................. | B44D 3/14 220/737 |
| 8,087,630 B1 * | 1/2012 | Matthews | ................. | A45F 3/44 248/156 |
| D676,716 S * | 2/2013 | Lalo | ........................... | D7/619.1 |
| 2005/0073832 A1 * | 4/2005 | Shilton | .............. | A47G 23/0216 362/101 |
| 2008/0179341 A1 * | 7/2008 | Kozel | ................ | A47G 23/0225 220/737 |
| 2011/0127283 A1 * | 6/2011 | Delucia | ..................... | A45F 5/02 220/739 |

* cited by examiner

*Primary Examiner* — Robert J Hicks
*Assistant Examiner* — Kareen Thomas
(74) *Attorney, Agent, or Firm* — Southeast IP Group, LLC; Thomas L. Moses

(57) ABSTRACT

A drink insulator stabilizer system is provided. In one embodiment, the stabilizer system includes a clip that attaches to the bottom portion of a drink insulator, and includes a pair of pivoting spikes on an underside of the clip. The spikes may be pivoted from a horizontal position within longitudinal indentations on an underside of the clip to a vertical position pointed downwardly from the clip, so that the spikes may be inserted into the ground to stabilize an insulated drink. In another embodiment, the pivoting spikes are positioned under the bottom portion of a drink insulator. In use, a user may rotate the spikes to a vertical position for use while the insulated drink is on the ground, and the spikes may rotate to a horizontal position and may snap fit into the longitudinal indentations for transport and storage purposes, when stabilization is not required.

16 Claims, 6 Drawing Sheets

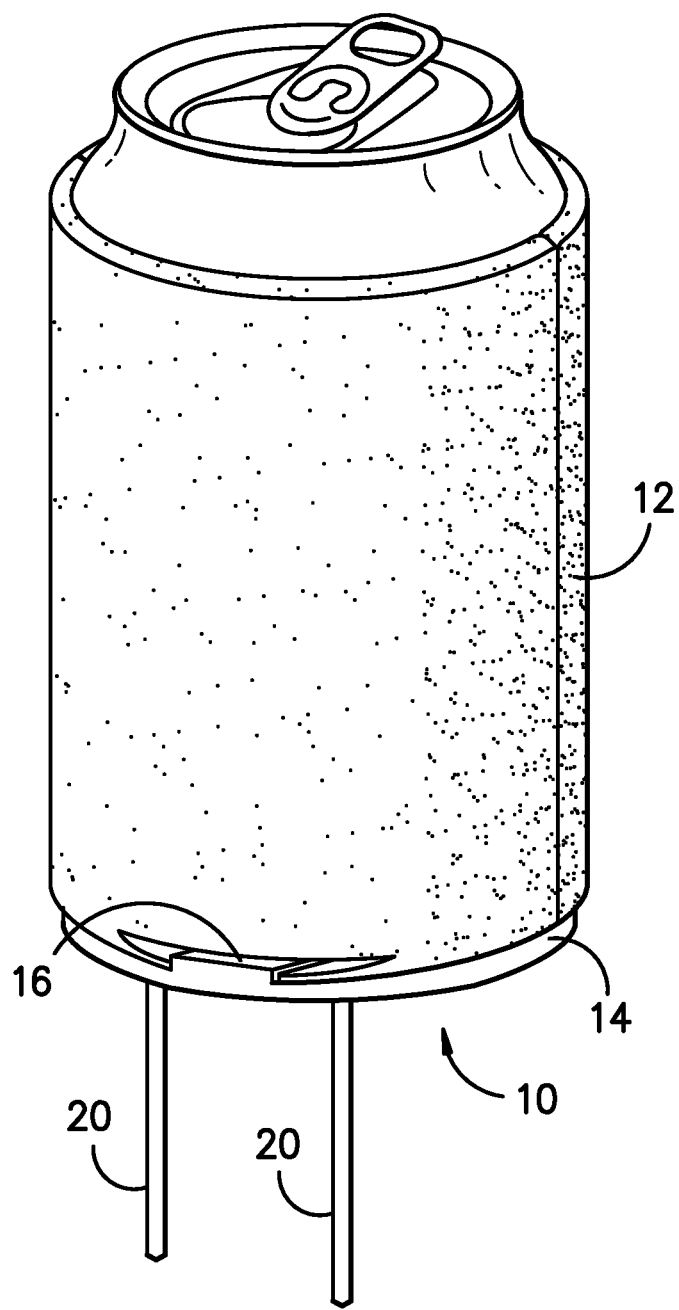
FIG. -1-

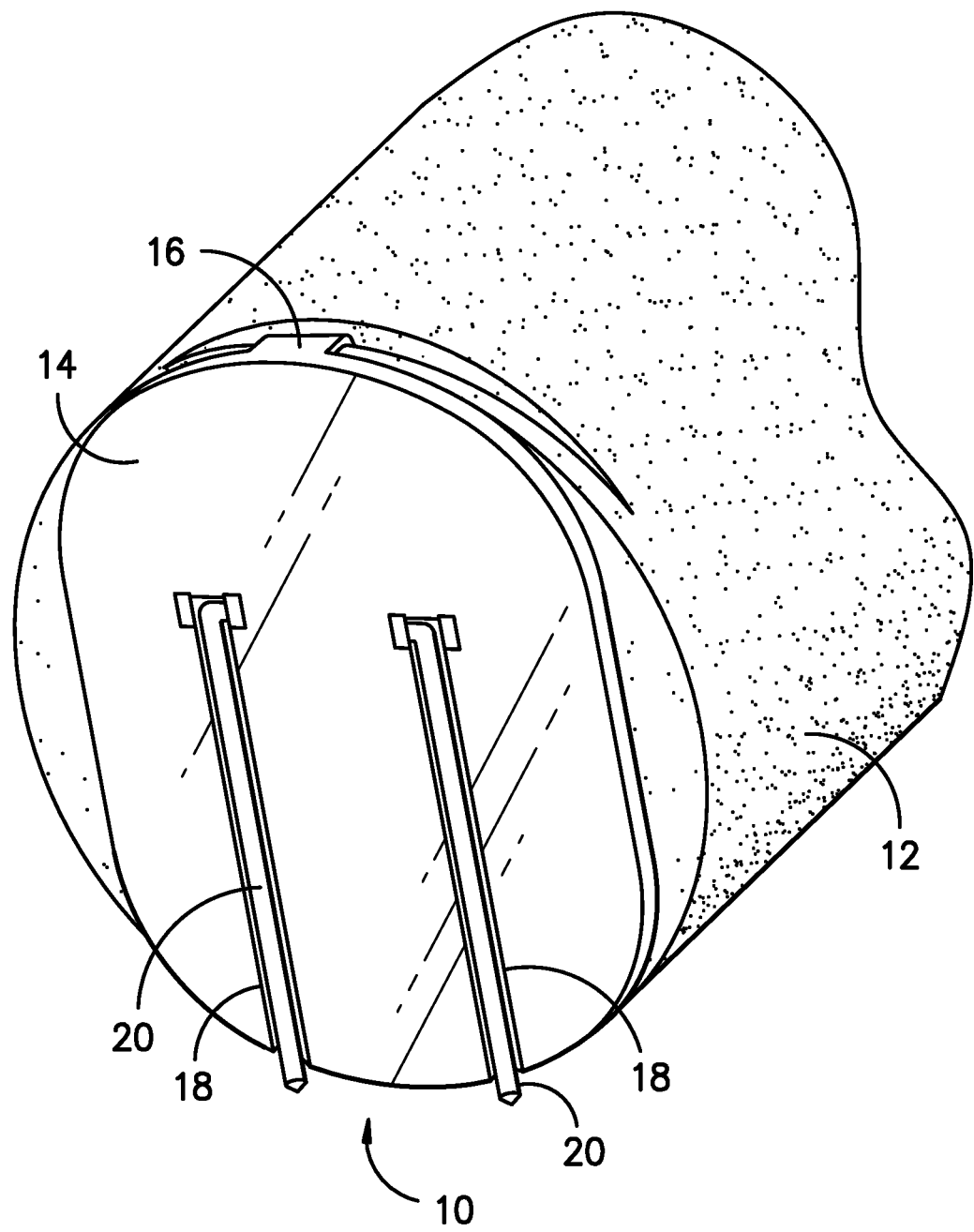
FIG. -2A-

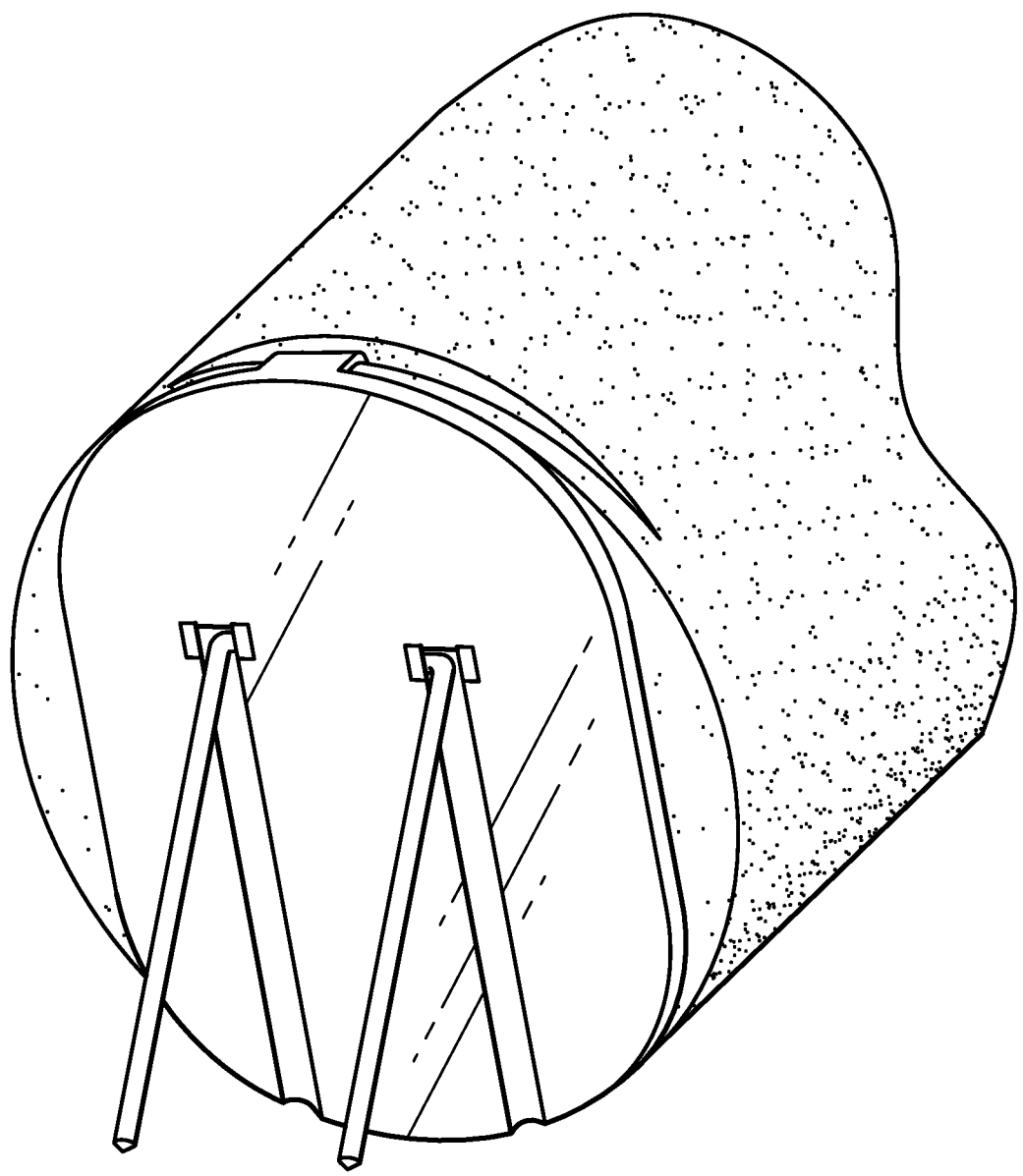
FIG. -2B-

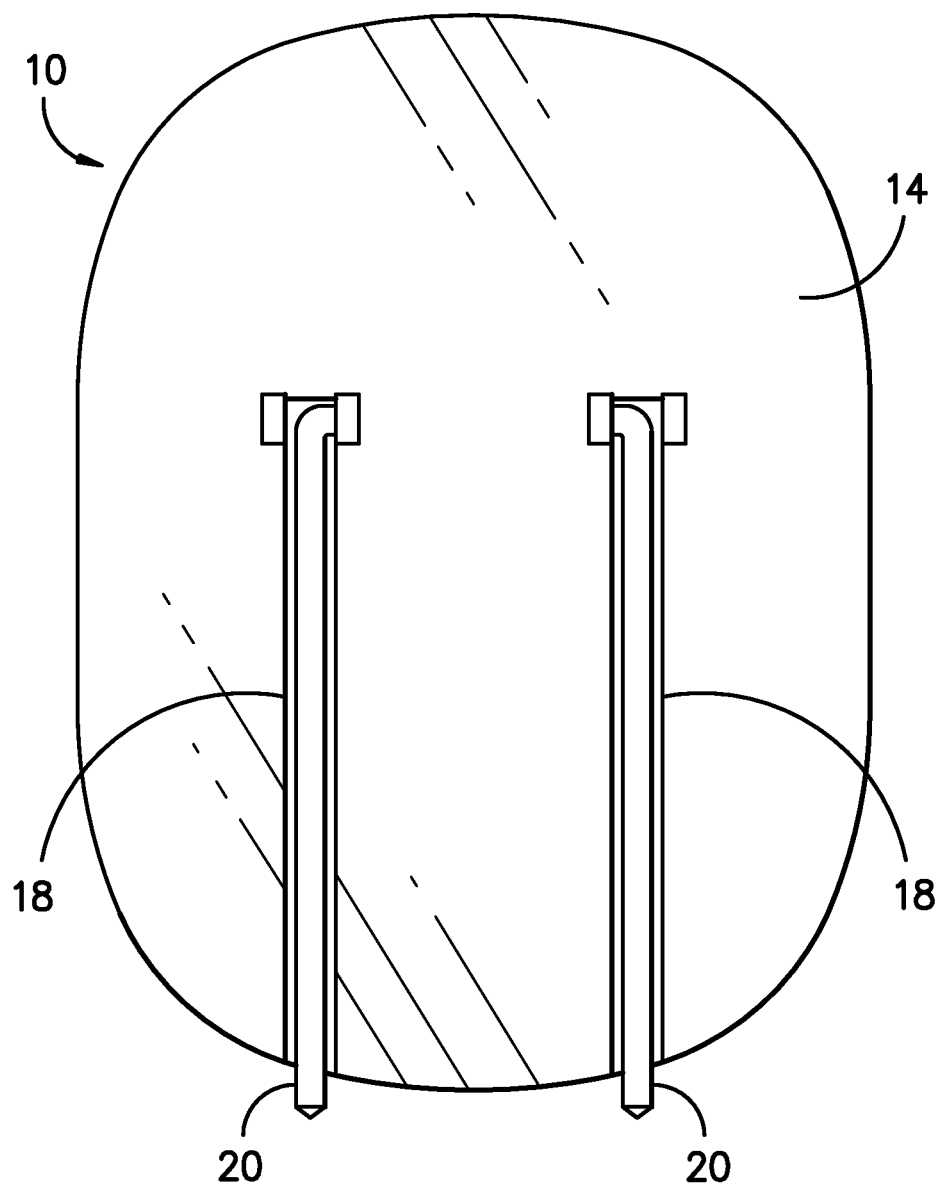
FIG. -3-

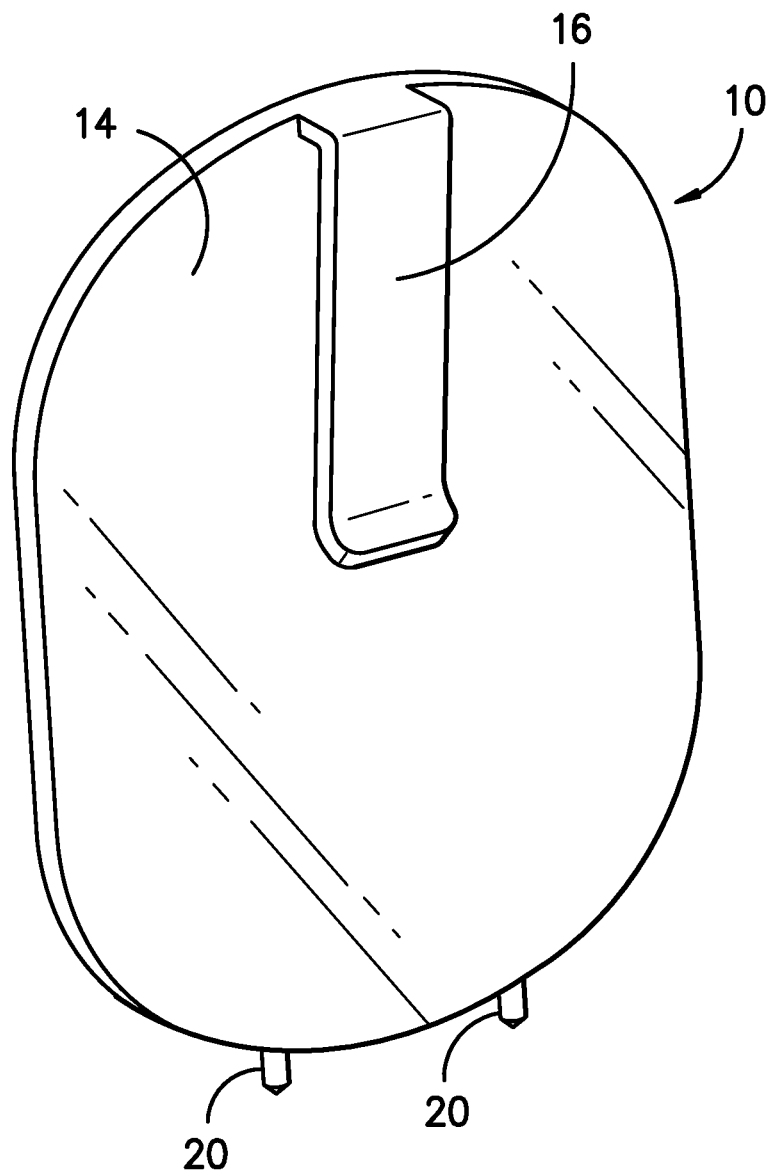
FIG. -4-

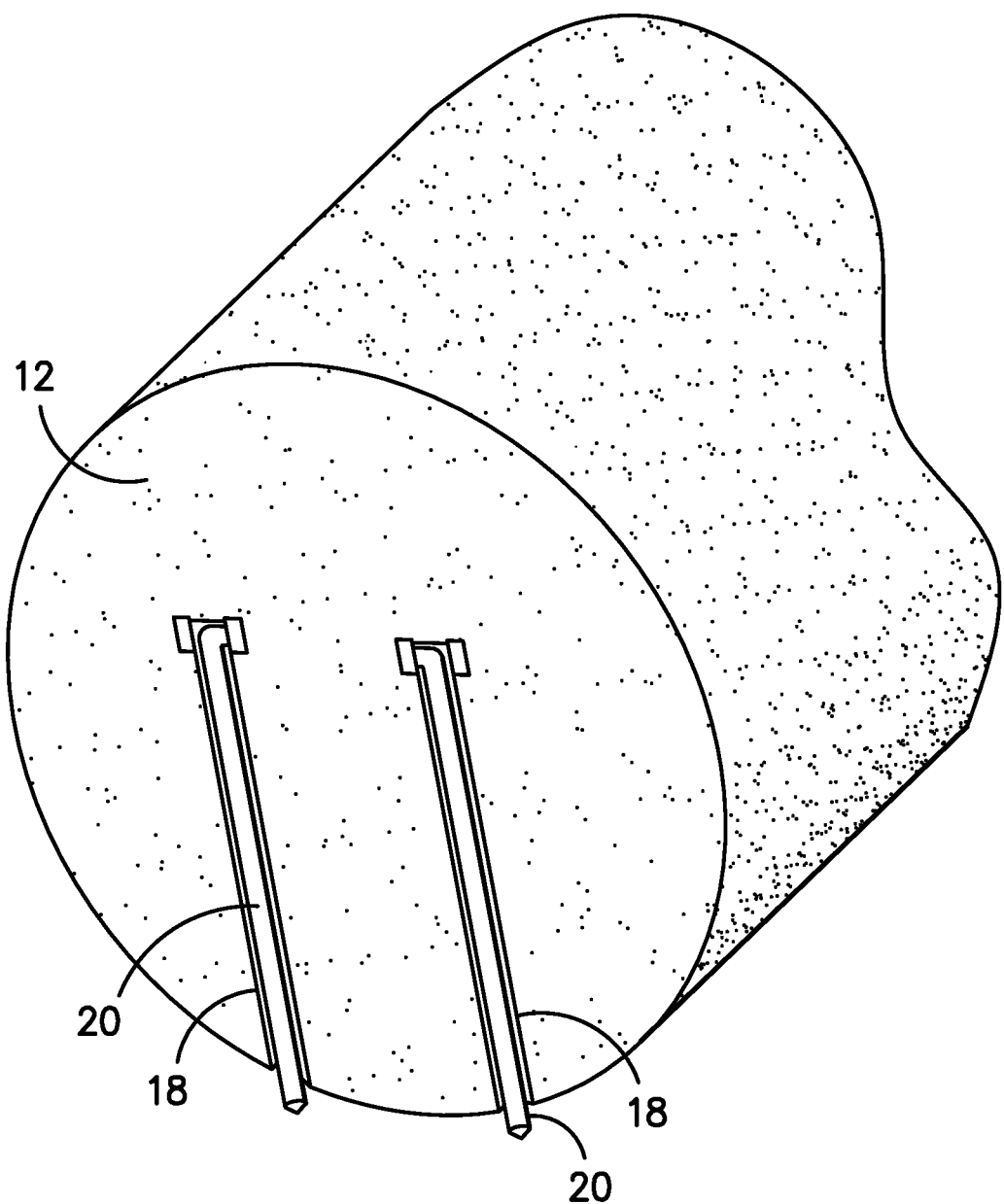
FIG. -5-

DRINK INSULATOR STABILIZER SYSTEM AND METHOD

BACKGROUND OF THE INVENTION

Commonly called "coozies," drink insulators of many types have become popular, particularly for outdoor activities. Generally, drink insulators are made of either a foam material, or an insulating fabric such as neoprene, and are shaped to fit onto the bottom and sides of a can or bottle. Drink insulators are used not only to keep drinks cold during warm weather, but may also be used in cold weather to keep a user's hands from getting cold while holding a drink. The foam drink insulators tend to hold their shape, whether or not a can or bottle is inserted therein. The soft drink insulators, made from neoprene and the like, are typically designed so that they may exist in a flattened state when they are not attached to a can or bottle. This design allows a user to put a soft drink insulator into their pocket, purse, or store it in some other small place without occupying much space.

One issue that is associated with drink insulators is that they do not provide any stability when they are placed on the ground or other soft surfaces. For instance, many times golfers use drink insulators for their drinks while playing a round of golf, and it is not unusual for a golfer to place the insulated drink on the ground briefly to take a shot. Similarly, beachgoers are constantly putting their insulated drinks down in the sand on the beach, and many times the ground surface is soft, uneven, and the wind is blowing, which causes the insulated drink to fall over and spill.

Therefore, it would be desirable to provide a drink insulator stabilization system that would allow a user to place an insulated drink on a ground surface (or other similarly soft surface) that would provide additional stability, thus preventing the drink from spilling while sitting on such a surface. Further, it would be desirable to have a first embodiment wherein the drink insulator includes pivoting spikes on an underside thereof, wherein the spikes could be directed downwardly and inserted into the ground for stability while the insulated drink is sitting on a soft surface, and wherein the spikes could be folded back to a position that is flush with the bottom of the drink insulator when the spikes are not in use. Alternatively, it would be desirable to provide a clip having pivoting spikes, wherein the clip could be removably attached to the bottom portion of a drink insulator, and the spikes could be used as described above.

BRIEF SUMMARY OF THE INVENTION

In accordance with one aspect of the invention, the present apparatus includes a drink insulator having a generally circular bottom portion attached to a tubular wall extending upwardly therefrom. An opening at the top allows a can, bottle, cup, or the like, to be inserted therein. The underside of the bottom portion may include a pair of longitudinal indentations that are recessed into the bottom portion, and each longitudinal indentation is adapted to receive a hinged spike member. Each spike member may pivot at one end in a roughly 90 degree arc, from a position disposed within the longitudinal indentation (wherein the spike is flush with the underside of the bottom portion of the drink insulator) to a position pointing directly downwardly below the drink insulator. The spike members may be stored in the longitudinal indentation when not in use, and may be rotated to the operational position pointing downwardly when a user wishes to place the insulated drink on the ground, so that the spikes may be inserted into the ground for purposes of stability.

In accordance with another aspect of the invention, a clip may be used to attach to the bottom portion of an existing drink insulator. The clip may include the pivoting spikes on an underside thereof. In this manner, a user can attach the clip to a pre-existing drink insulator, rotate the spikes into the operational position, and insert the spikes into the ground in order to stabilize the insulated drink.

BRIEF DESCRIPTION OF THE DRAWINGS

These and other features, aspects, and advantages of the present invention will become better understood with regard to the following description, appended claims, and accompanying drawings where:

FIG. 1 is a perspective view of one embodiment of a drink insulator stabilizer system, showing a drink insulator having a clip removably attached to a bottom portion thereof, wherein the clip includes a pair of pivoting spikes on an underside thereof;

FIG. 2A is a perspective view of a clip attached to a bottom portion of a drink insulator, wherein the clip includes a main body portion, a finger on an upper side thereof for attachment of the clip to the drink insulator, and a pair of pivoting spikes in the storage position within the longitudinal indentations defined on the bottom portion of the clip;

FIG. 2B is a perspective view of the clip shown in FIG. 2A, wherein the spikes are pivoted outwardly from the bottom portion of the clip;

FIG. 3 is a bottom view of the clip shown in FIGS. 2A and 2B, showing the pivoting spikes positioned in the storage position within the longitudinal indentations on an underside of the clip; and FIG. 4 is a perspective view of a clip for attachment to a bottom portion of an insulated drink holder, wherein the clip includes a finger member on one side for attachment to the drink holder, and a pair of pivoting spikes on the opposite side of the clip;

FIG. 5 is a perspective view of a bottom portion of an insulated drink holder, wherein a pair of pivoting spikes is disposed on a bottom portion thereof, and wherein the spikes are disposed in a closed position within a pair of longitudinal indentations on the bottom portion of the insulated drink holder.

DETAILED DESCRIPTION OF THE INVENTION

The present invention is drawn to a drink insulator stabilizer system and method. In a first embodiment, as shown in FIGS. 1-3, a clip 10 is provided for removable attachment to a bottom portion of a drink insulator 12. The clip 10 includes a generally round main body member 14 and a finger portion 16 that is fashioned to pinch the bottom portion of a drink insulator 12 and maintain the clip 10 in position on the bottom of the drink insulator 12 via tension and frictional engagement, as shown in FIGS. 1-3. The clip 10 engages the bottom of the drink insulator 12 in much the same way as a money clip attaches to paper money. The underside of the main body member 14, in a preferred embodiment, defines a pair of longitudinal indentations 18, as shown in FIGS. 2A, 2B and 3. A pair of pivoting or hinged spikes 20 are disposed on the underside of the main body member 14, each spike 20 may fit (or preferably snap fit)

into a longitudinal indentation 18 for storage and transport, while the spikes 20 are not in operation as a stabilizing mechanism.

The spikes 20 may be formed individually, so that each spike 20 rotates or pivots independently of the other, or the spikes 20 may be connected at one end by a cross-connector. If a cross-connector is employed, then both spikes 20 move in unison with each other. The spikes 20 preferably are designed to pivot in a generally 90° arc, from a storage position within the longitudinal indentations 18, to a position wherein the spikes 20 are directed downwardly, and preferably may snap into the downward position, as shown in FIG. 1. In this downward position, the spikes 20 may be forced into the ground, in order to stabilize the insulated drink while it sits on the ground, at the beach or on a golf course, for instance.

In one embodiment, as shown in FIGS. 2A, 2B and 3, the spikes 20 are disposed so that they move in the same direction while pivoting. In an alternate embodiment, the spikes 20 may be oriented so that they move in opposite directions, so that if each spike 20 were disposed at a 45° angle, their position would form an X shape as viewed from the side. The spikes 20 are preferably made from a generally rigid material, such as metal or plastic, but may be made from any suitable material. It is contemplated that the spikes 20 may include pointed tips at a distal end thereof, to facilitate insertion into the ground or other soft surface (such as snow, for instance)

In use, a user simply slides the clip 10 onto the bottom portion of a drink insulator as shown, inserts a can, bottle or cup into the drink insulator, and when the user wishes to place the insulated drink onto a ground surface (or other similar surface), the user pivots the spikes 20 into the downward pointing position for insertion into the ground, as shown in FIG. 1. The spikes 20 serve to stabilize the insulated drink on uneven surfaces, particularly in windy conditions, and help to prevent the insulated drink from toppling over and spilling the contents all over the ground. When the user picks up the insulated drink again, he can simply rotate the spikes 20 back into the storage or transport position by snapping them into the longitudinal indentations, as shown in FIGS. 2A and 3.

In another embodiment, as shown in FIG. 5, the drink insulator stabilizer system includes a drink insulator having a pair of pivoting spikes 20 on an underside thereof. In this embodiment, the drink insulator 12 includes a generally round bottom portion attached to a cylindrical side member having an opening at a top portion thereof for receiving a can, bottle or cup. The underside of the bottom portion defines a pair of pivoting spikes 20 that may be in any configuration that was previously discussed with reference to the clip 10. In this embodiment, rather than having a clip 10 that attaches to a pre-existing drink insulator, the pivoting spikes 20 are simply connected directly to the bottom portion of the drink insulator 12. Similarly to the clip 10, the spikes 20 are employed in the downward position when the insulated drink is to be set on the ground, and are then pivoted back into the storage and transport position within a pair of longitudinal indentations 18 when not needed for stabilization purposes. The bottom portion of the drink insulator, in this embodiment, is preferably generally rigid, although it could be made from a foam material that is commonly used for manufacturing drink insulators today.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

What I claim is:

1. A drink insulator stabilizer comprising:
    a clip having a main body member having a top portion and an underside,
    a finger positioned on a top portion of said main body member, said finger extending across said top portion of said main body member so that a bottom portion of a drink insulator may be removably secured between said main body member and said finger;
    said underside of said main body member defining at least one longitudinal indentation; and
    at least one spike pivotally attached to said underside of said main body member so that said spike may rotate between a generally horizontal position within said longitudinal indentation for storage and transport, and a second generally vertical operating position wherein said spike extends downwardly from said clip.

2. The drink insulator stabilizer set forth in claim 1, wherein said underside of said main body member defines a pair of longitudinal indentations, and a pair of pivoting spikes are attached to said underside of said main body member so that each spike is received by a longitudinal indentation when said spikes are in the generally horizontal position.

3. The drink insulator stabilizer set forth in claim 2, wherein said spikes are connected to one another on one end thereof by a cross-connector so that said spikes rotate together in unison with one another.

4. The drink insulator stabilizer set forth in claim 2, wherein said spikes operate independently from one another, so that one spike may be disposed in the generally horizontal position and the other spike may be disposed in the generally vertical position.

5. The drink insulator stabilizer set forth in claim 1, wherein said spike snap fits into said longitudinal indentation.

6. The drink insulator stabilizer set forth in claim 2, wherein said spikes snap fit into said longitudinal indentations.

7. The drink insulator stabilizer set forth in claim 1, wherein said spike includes a point on a distal end thereof.

8. The drink insulator stabilizer set forth in claim 1, wherein said main body member is formed into a generally circular shape.

9. The drink insulator stabilizer set forth in claim 1, wherein said finger is formed into a generally rectangular shape.

10. A drink insulator stabilizer comprising:
    a drink insulator including a generally circular bottom portion and a generally cylindrical side portion attached to said bottom portion;
    said bottom portion defining at least one at least one longitudinal indentation on an underside thereof; and
    at least one spike pivotally attached to said underside of said bottom portion so that said spike may rotate between a generally horizontal position within said longitudinal indentation for storage and transport, and a second generally vertical operating position wherein said spike extends downwardly from said drink insulator.

11. The drink insulator stabilizer set forth in claim 10, wherein said underside of said drink insulator defines a pair of longitudinal indentations, and a pair of pivoting spikes are attached to said underside of said drink insulator so that each spike is received by a longitudinal indentation when said spikes are in the generally horizontal position.

12. The drink insulator stabilizer set forth in claim 11, wherein said spikes are connected to one another on one end thereof by a cross-connector so that said spikes rotate together in unison with one another.

13. The drink insulator stabilizer set forth in claim 11, wherein said spikes operate independently from one another, so that one spike may be disposed in the generally horizontal position and the other spike may be disposed in the generally vertical position.

14. The drink insulator stabilizer set forth in claim 10, wherein said spike snap fits into said longitudinal indentation.

15. The drink insulator stabilizer set forth in claim 11, wherein said spikes snap fit into said longitudinal indentations.

16. The drink insulator stabilizer set forth in claim 10, wherein said spike includes a point on a distal end thereof.

\* \* \* \* \*